US006529743B1

(12) United States Patent
Thompson et al.

(10) Patent No.: US 6,529,743 B1
(45) Date of Patent: Mar. 4, 2003

(54) UNIVERSAL WIRELESS TELEPHONE TO MODEM ADAPTER

(75) Inventors: Curtis Duane Thompson, Taylorsville, UT (US); Kenneth A. Croft, Salt Lake City, UT (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/280,331

(22) Filed: Mar. 29, 1999

(51) Int. Cl.[7] .................................................. H04Q 7/20

(52) U.S. Cl. ....................................... 455/557; 455/556

(58) Field of Search ................................ 455/550, 551, 455/554, 555, 556, 557, 558, 100, 11.1, 66, 420, 552; 380/24, 49; 710/64, 12, 67; 375/220; 370/466, 467

(56) References Cited

U.S. PATENT DOCUMENTS 4,012,596 A 3/1977 West, Jr. et al.
4,658,096 A 4/1987 West, Jr. et al.
4,718,080 A 1/1988 Serrano et al.
4,737,975 A 4/1988 Shafer
4,775,997 A 10/1988 West, Jr. et al.
4,837,800 A 6/1989 Freeburg et al.
4,887,290 A 12/1989 Dop et al.
5,127,041 A 6/1992 O'Sullivan
5,249,218 A 9/1993 Sainton
5,430,793 A 7/1995 Ueltzen et al.
5,566,226 A * 10/1996 Mizoguchi et al. ......... 455/557
5,678,229 A * 10/1997 Seki et al. .................. 455/343
5,809,115 A * 9/1998 Inkinen ...................... 455/557
5,873,039 A * 2/1999 Najafi ........................ 455/454
5,896,574 A * 4/1999 Bass, Sr. .................... 455/557
5,953,658 A * 9/1999 Scott .......................... 455/422
5,983,073 A * 11/1999 Ditzik ....................... 455/11.1
5,991,410 A * 11/1999 Albert et al. ................ 380/24
5,999,996 A * 12/1999 Dunn .......................... 710/64
6,006,109 A * 12/1999 Shin ........................... 455/557
6,101,397 A * 8/2000 Grob et al. ................. 455/557
6,131,136 A * 10/2000 Liebenow et al. .......... 710/131
6,141,356 A * 10/2000 Gorman ...................... 370/493
6,230,010 B1 * 5/2001 Morris ....................... 455/426
6,278,775 B1 * 8/2001 Sih et al. ............... 379/100.17
6,295,460 B1 * 9/2001 Nagel et al. ................ 455/557

FOREIGN PATENT DOCUMENTS

JP 2870574 3/1999

* cited by examiner

*Primary Examiner*—Dwayne Bost
*Assistant Examiner*—Jean A Gelin
(74) *Attorney, Agent, or Firm*—Workman, Nydegger & Seeley

(57) ABSTRACT

A wireless communication system configured to transceive information through use of a wireless telephone, the wireless communication system comprising a host that is configured to transmit and receive a signal. In communication with the host is an analog-only capable modem. The modem is capable of transceiving the signal along an analog communication network. Coupled with the modem and the wireless telephone is a communication adaptor mechanism which is configured to convert the signal from the modem such that the wireless telephone is capable of transceiving the signal.

24 Claims, 8 Drawing Sheets

10
22
12
DIAGNOSTIC APPLICATION
SIG/QUAL
CONNECT RATE: 28K
ERROR RATE: GOOD
COMMUNICATION APPLICATION
16
20
18
14

10

UNIVERSAL WIRELESS TELEPHONE TO MODEM ADAPTER

BACKGROUND OF THE INVENTION

1. The Field of the Invention

This invention relates generally to interfaces between components of a communication network and more particularly to methods, systems and apparatus for adapting a communication device to be capable of use within a wireless communication network.

2. Present State of the Art

Digital communication has become very ubiquitous in their deployment. Most notable, personal computers as well as other general purpose computers have become highly commonplace as data generation and data manipulation devices. Additionally, computers have become more commonly used as communication devices whether for the generation of textual or graphical material or for consumption, namely the viewing perceiving, of computer data.

In an effort to make computers more extensible interface devices, computers have been able to be linked together using network topologies and architectures. Those familiar with computer networks appreciate that the physical coupling of computers to each other requires the use of a physical network which traditionally includes the presence of a physical conduit such as electrically conducting wires or alternatively optical conduits such as fiber optic cables.

In an effort to utilize well established cabling or conduit environments, the public switched telephone network has been widely adopted by the computer community as an acceptable wire-based physical interconnection for computers desiring to form a network. Those familiar with the public switched telephone network appreciate that such a network was originally designed for the conduction of frequencies in the voice bands over their networks. Therefore, in order to transmit data information across the public switched telephone network, devices have been employed to transform the digital data, common to computers, into a format capable of propagating across the telephone network. Devices capable of such transformation are commonly known as modems (MODulate/DEModulates) and provide a carrier frequency upon which the digital data is imposed for propagating across the physical public switch telephone network.

It is appreciated that the public switched telephone network typically implements its physical interconnection using a two-wire system wherein one of the wires is commonly known as the Tip signal while the other signal is commonly known as the Ring signal. Together, the Tip and Ring signals provide the wired interface with which a modem, which is operably coupled to a computer, interacts on the network. It should be apparent that employing the public switched telephone network with its wired interface presents several limitations. First, since the wired interface was established for use with voice frequencies which are characteristically of lower frequencies than data information, it presents a significant bottleneck for the transfer of data. Secondly, since the wired interface of the public switched telephone network requires physical coupling of a computer having a modem or similar device thereby imposing a static environment which precludes widespread movement of the computer device.

In an attempt to address the shortcomings, wireless communication channels such as cellular communication systems have been investigated as potential "physical" network interfaces for computers having modems. In order to accommodate the wireless communication system, several modem manufactures have developed cellular specific modems that enable a user to connect the modem to a wireless transceiver device such a cellular telephone. However, several shortcomings of the wireless networks have impeded the common use of a wireless physical channel informing computer networks. First, traditional wireless service has to date, been a rather expensive channel through which to dispatch data. Secondly, the use of wireless transceivers has been somewhat cumbersome as unique modems capable of interfacing with wireless transceivers have needed to be developed. Thirdly, the development of a data interface to a wireless transceiver such as a cellular phone has not been standardized as individual transceiver manufactures have promulgated their own individual interface standards. To accommodate the unique data interface of cellular phones promulgated by their individual manufactures, modem manufactures have been forced to develop modems that have both a traditional public switched telephone network wired-interface as well as a transceiver manufacture-specific wireless interface that is compatible only with a particular wireless transceiver manufacture's specification. Such custom modems have proven both expensive to consumers and manufactures.

An attempt has been made to create a generic-like cellular interface on a wireless-capable modem device that presents a common physical interface such as a standardized connector. However, to facilitate the unique nature of both the wireless transceiver's operational aspects as well as the physical connecting interface, a custom interconnection cable unique to a specific wireless transceiver has been developed. Therefore, in such an attempt, a cable assembly having a common interface is capable of coupling to the wireless modem while the opposing connector end of the cable assembly is comprised of a connector that is unique to a specific wireless transceiver manufacture's device. Additionally, in order to operably transfer the data between a wireless transceiver and a computer, manufacture-unique operational software capable of formatting and transceiving data with the wireless transceiver must also be included within the manufacture-unique modem device.

Therefore, the utilization of a wireless (physical) channel in a data network has required custom modem development. Those skilled in the art of modems, appreciate that continuous improvements to modems is common place. Therefore, a modem device that may be state of the art at one point in time may be obsolete within months thereafter. Therefore, to include a wireless interface that is unique to specific transceiver manufactures on a device that is frequently undergoing improvements leads to unnecessary expense and functionality waste when modems are updated or replaced entirely.

Therefore, it would be an improvement to provide a system for enabling a traditional modem architecture to interface with a wireless communication network without burdening the standardized wired modem industry.

SUMMARY AND OBJECTS OF THE INVENTION

It is an object of the present invention to provide a communication device that is capable of working with a variety of world-wide wireless networks.

Another object of the present invention is to provide a communication device which is capable of working with various types of wireless telephones.

It is another object of the present invention to provide a communication device which only requires the changing of an adapter cable to allow communication through a wireless communication network, from an analog-only capable modem.

It is another object of the present invention to provide a wireless communication device which is inexpensive.

It is another object of the present invention to provide a method of converting a signal transceived by a host which is incapable of wireless communication such that the signal is capable of being transceived within a wireless communication network.

It is another object of the present invention to provide a method and system that modulates and demodulates a signal transceived by a host that is in cooperation with a modem that is only capable of transmitting an analog signal such that the signal may be transceived by a wireless telephone.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the foregoing objects, and in accordance with the invention as embodied and broadly described herein, a wireless communication system configured to transceive information through use of a wireless telephone is provided. The wireless communication system comprises a host that is configured to transmit and receive a signal. In communication with the host is an analog-only capable modem. The modem is capable of transceiving signals within an analog communication network. Coupled with the modem and the wireless telephone is a communication adaptor which is configured to convert the signals transceived by the modem such that the wireless telephone is capable of transceiving the signal.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope methods, systems and devices for converting a signal output from an analog-only capable modem such that the signal is capable of being transceived (transmitted or received) by way of a wireless communication network, such as a wireless network. In the context of wireless networks, the universal wireless adapter device is used in combination with a modem being external or internal to a personal computer or other similar host.

Figure 1:
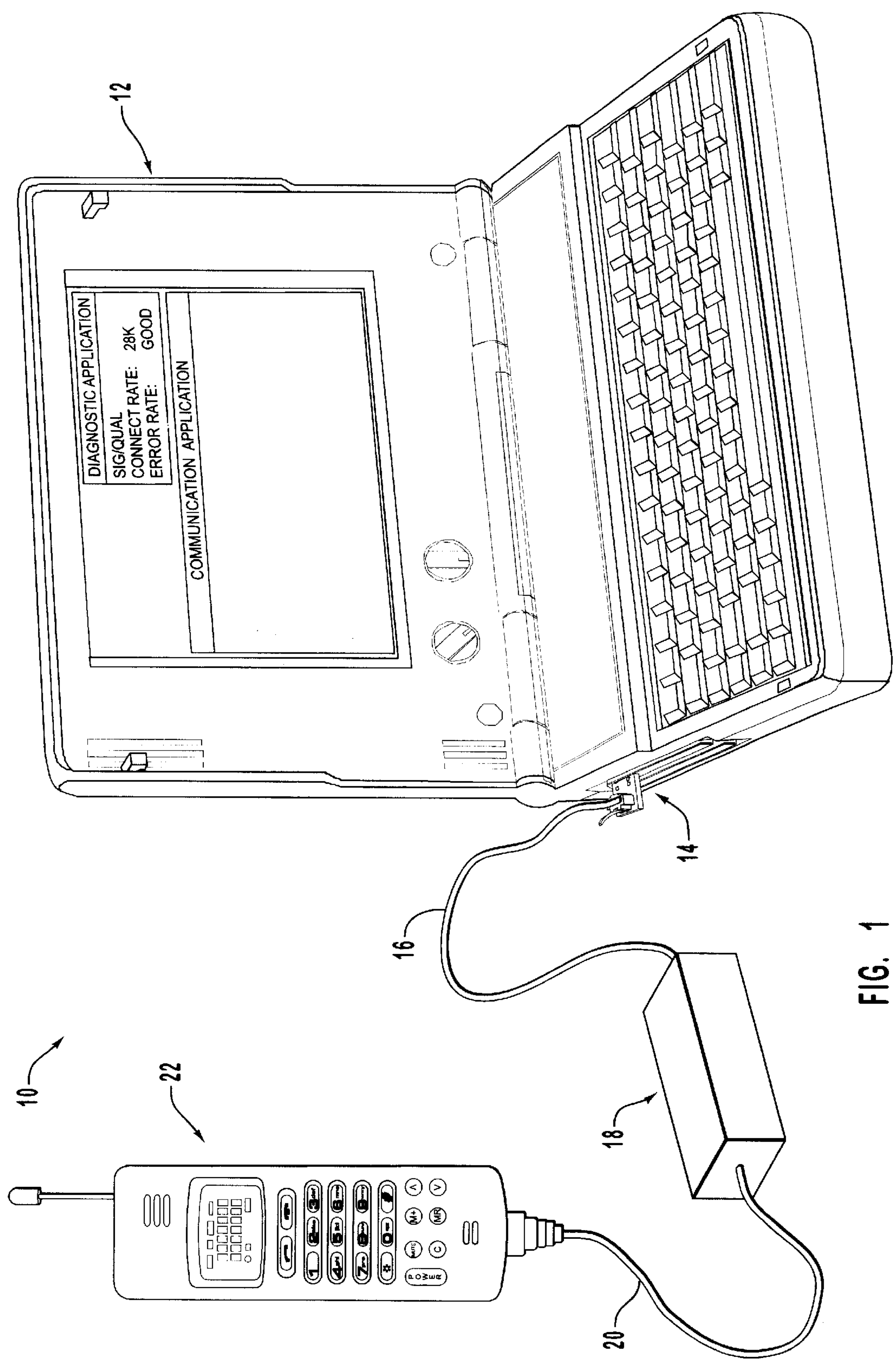
FIG. 1 is a perspective view of a wireless communication system, in accordance with a preferred embodiment of the present invention.

Referring now to FIG. 1, a wireless communication system 10 is depicted. Wireless communication system 10 comprises a host 12, which in this exemplary configuration is in the form of a personal computer. It can be appreciated, however, that various other configuration of host 12 can also perform the function thereof.

Host 12 communicates with the other components of wireless communication system 10 by way of a digital signal. Host 12 in this exemplary configuration, is in communication with a modem 14. Modem 14, as depicted in FIG. 1, is a PCMCIA card form factor which externally is only capable of transceiving an analog signal. Modem 14 modulates and demodulates the digital signal generated by host 12 so that the digital signal is converted into an analog signal which can propagate the public switched telephone network (PSTN). Modem 14 can be configured in a wide variety of form factors. For example in one embodiment, modem 14 comprises a communication card carried internal to a computer or other peripheral. In another embodiment, modem 14 comprises a small form factor communication card which can be carried internal to a portable laptop, notebook, or other portable computer. In still another embodiment, modem 14 comprises a separate communication card which is attached external to the computer or other peripheral.

In communication with modem 14 by way of cable 16 is a universal wireless adaptor device 18. Universal wireless adaptor device 18 performs the functionality required to manipulate signals transceived by modem 14 such that the signals are in a wireless transceiver compatible standard unique to the wireless communication network. Therefore, universal wireless adaptor device 18 is one example of wireless adaptor means for converting the signal from the modem such that the wireless telephone is capable of transceiving the signal.

Universal wireless adaptor device 18 is in electrical and signal communication with a wireless telephone 22 through wireless telephone specific cable 20. Wireless telephone specific cable 20 is specific for each type of wireless telephone 22. Therefore, universal wireless adaptor device 18 can be formed such that it performs generic operations while providing an interface which accommodates for various wireless telephones by way of wireless telephone specific cable 20. Universal wireless adaptor device 18 is formed from various components and performs numerous functions, as will be described hereafter.

Figure 2:
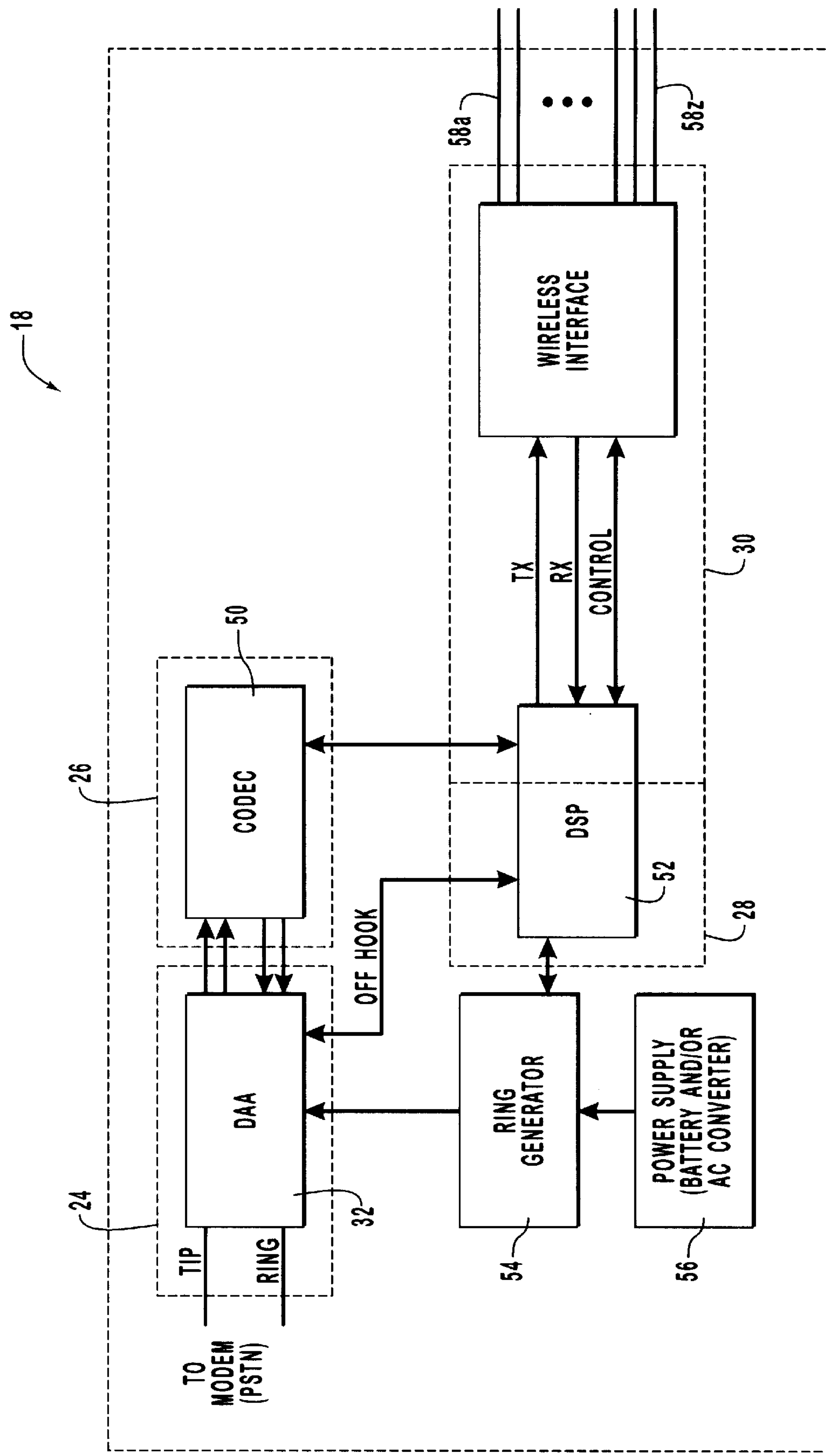
FIG. 2 is a block diagram of a wireless adaptor of the wireless communication system in accordance with a preferred embodiment of the present invention.

Referring now to FIG. 2, an overall block diagram of universal wireless adaptor device 18 is depicted. Universal wireless adaptor device 18 comprises a modem interface 24 and a wireless interface 30. Coupled between modem interface 24 and wireless interface 30 is coding/decoding circuitry 26 and control circuitry 28.

Modem interface 24 is the means by which universal wireless adaptor device 18 communicates with modem 14 and hence host 12 (both of FIG. 1). In this preferred embodiment of the present invention modem interface 24 has the form of a data access arrangement (DAA) 32. Modem interface 24 is one example of a communication interface configured to communicate with a modem capable of solely transceiving an analog signal.

Figure 3:
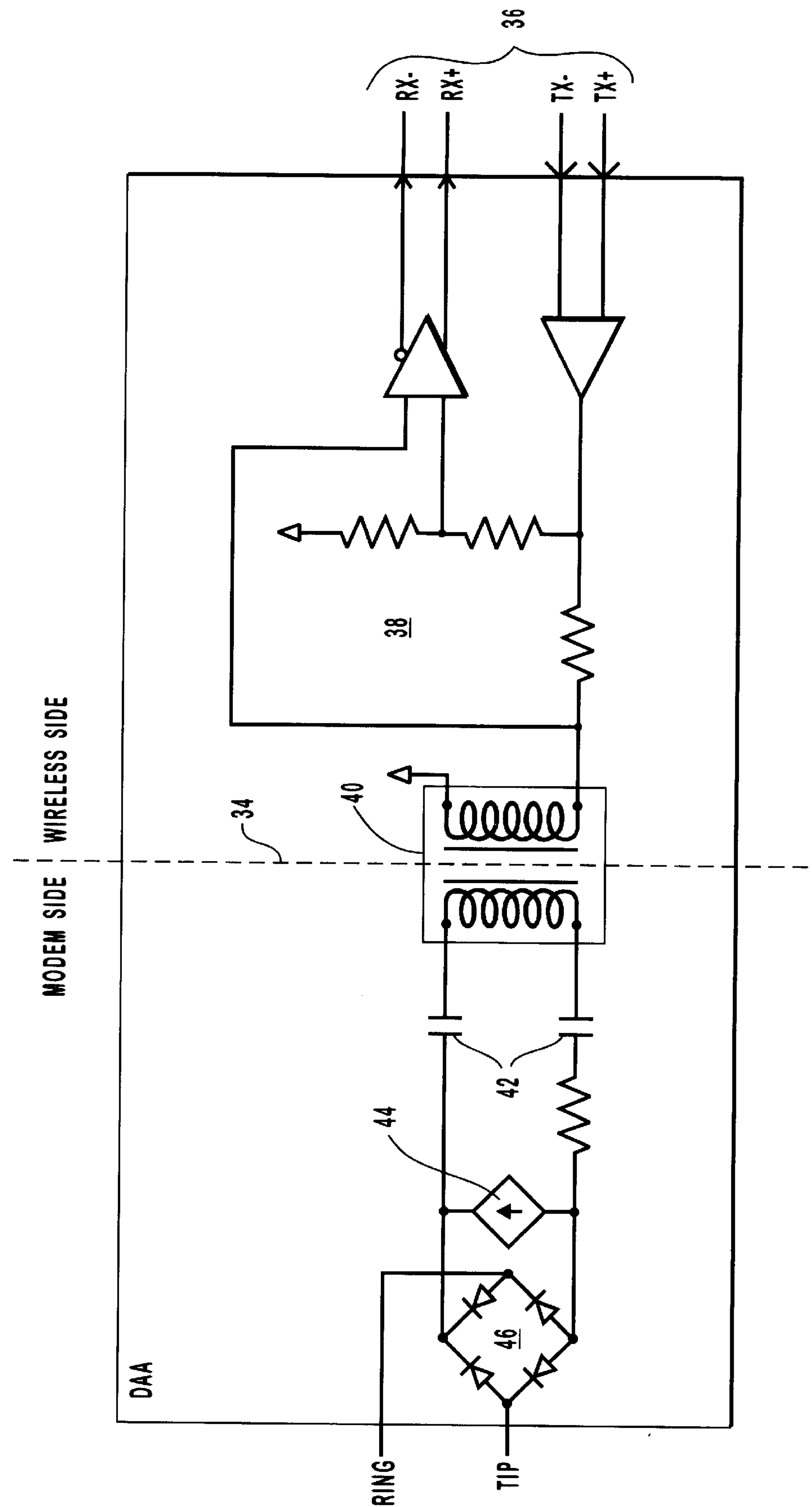
FIG. 3 is a circuit diagram of a direct access arrangement (DAA) of the wireless adaptor in FIG. 2.

DAA 32 isolates universal wireless adaptor device 18 from external signals which could be injurious to host 12, modem 14 or other components of communication system 10. DAA 32 further incorporates on the modem-side a signal interface to provide access to transceived signals coupled to hybrid circuitry 38 (FIG. 3). Due to the combining of the transmit and receive signals on the modem-side, hybrid circuitry 38 removes or cancels the transmit signal from the receive signal. In other words, DAA 32 is a converter which takes the transceived signal and separates the transmit signal into positive and negative transmit signals and separates the receive signal into positive and negative receive signals. In addition to the conventional functionality contained within DAA 32, DAA 32 also contains a "off-hook" detection circuit which allows universal wireless adaptor device 18 to recognize when modem 14 is in a state ready to transceive a signal.

There are various configurations of DAA 32 which are capable of performing the desired function and are commonly known to one skilled in the art. For example, in a one configuration of the present invention, as shown in FIG. 3, a traditional DAA 32 is depicted which encompasses an isolation boundary 34. The isolation boundary 34 forms a partition between a modem side with an input on the PSTN lines, and the wireless side connected to the wireless communication network. In this specific DAA implementation, the wireless side includes a wireless signal interface 36 with the coder/decoder (CODEC) circuitry 26 (FIG. 2) to provide access to transmit and receive signals coupled to hybrid circuit 38.

Isolation boundary 34 is established across a transformer 40 which provides the required coupling between the modem-side and the wireless-side. Because of the inherent nature in transformer coupling, the modem-side and the wireless-side may float with respect to a potential across isolation boundary 34. Traditional implementations of the modem-side circuitry in DAA 32 include bypass capacitors 42, a hold circuit 44, and a diode bridge 46 for creation of the tip and ring signals characteristic of the PSTN lines coupled to modem 14. Hold circuit 44, among other things, incorporates the "off-hook" detection circuit to identify when modem 14 is ready to transmit or receive a signal. When "off-hook" occurs, DAA 32 signals control circuitry 28 to generate a dial tone.

In an alternate configuration, hold circuit 44 further includes a ring detector for notifying a user of an incoming signal. In yet another alternate configuration, DAA 32 is formed from linear optical components that use active regions of an optical isolator to transfer the analog signal.

Coding/decoding circuitry 26 communicates with modem interface 24. In this preferred embodiment of the present invention, coding/decoding circuitry 26 has the form of coder/decoder 50 or CODEC 50. CODEC 50 provides a transformation between the modulated analog signal which is transceived from modem 14 and the requisite digital signal which is transceived by control circuitry 26. In other words, CODEC 50 performs the necessary coding and decoding of the signals to and from modem 14 and wireless telephone 22.

In view of the teaching contained herein, one skilled in the art can identify various other configurations of coding/decoding circuitry 26 or other functional substitutes which are capable of performing the same function thereof. For example, the transformation from modulated analog signal to digital signal may include functionality provided by control circuitry 28 such that, in the case of transmission of a signal from modem 14, CODEC 50 manipulates the analog signal in preparation for digitizing through control circuitry 28.

Coding/decoding circuitry 26 outputs the requisite digital signal to control circuitry 28. Control circuity 28 is functionally configured to control the conversion of the transceived analog signal to a digital signal. In this preferred embodiment of the present invention, control circuitry 28 may cooperate with wireless phone interface 30 to perform the necessary transformation of the digital signal to the requisite wireless transceiver compatible standard for the specific wireless transceiver or wireless telephone 22.

Control circuitry 28 is formed from a digital signal processor 52 or DSP 52. DSP 52 is a processor or controller that executes the repetitive tasks of calculating complex mathematical algorithms necessary to perform the requisite digital manipulation of the signal either transmitted from CODEC 50 or to be received by CODEC 50. DSP 52 thereby controls universal wireless adaptor device 18 with regards to the flow of the transceived signal to and from modem 14 and wireless telephone 22.

In addition to manipulating the signals transceived by universal wireless adaptor device 18, DSP 52 controls the negotiations and modulation schemes necessary to transceive signals to and from universal wireless adaptor device 18 and separates the data from the modulated signal and transceives the data as necessary, such as to wireless interface 30. Such control may include, by way of example and not limitation, a determination of the speed at which universal wireless adaptor 18 communicates with wireless telephone 22 and/or modem 14. For example, a modem which is capable of transferring data at a rate of 9600 bits per second (bps) requires a different negotiation protocol than a modem which transfers data at 56.6 kbps. Various modems may be utilized with the present invention and with which DSP 52 has to negotiate, such as but are not limited to, 28.8 kbps 36.6 kbps, or the like.

According to another aspect of control circuitry 28, DSP 52 controls the generation of a dial tone when universal wireless adapter device 18 is in receiving mode. DSP 52 causes the creation of a dial tone to be sent to CODEC 50. In transmission mode, DSP 52 controls and generates the ring signal that requests modem 14 to change from "on-hook" to "offhook." This is accomplished by activating a ring generator 54 which is in electrical communication with a power supply 56. DSP 52 sends a signal to ring generator 54 to thereby create a ring signal on the PSTN lines. Ring generator 54 draws voltage from power supply 56 and drives the voltage to DAA 32. DAA 32 injects the voltage as a line voltage and ring signal onto the PSTN lines thereby activating modem 14. It can be appreciated that ring generator 54 and power supply 56 are well known in the art and may lake various forms. For example, power supply 56 may be a plurality of batteries and/or an AC converter.

In addition to the functions described herein, DSP 52 may perform various other functional operations and may combine with other elements of universal wireless adaptor device 18 to perform the desired functions of universal wireless adaptor device 18. For example, DSP 52 may be formed without circuitry to control ring generation, but may cooperate with DAA 32 which is formed with ring generation circuitry. DSP 52 may solely perform the function of digitizing or de-digitizing the transceived be CODEC 50 or wireless interface 30. In view of the teaching contained herein, one skilled in the art can identify various other configurations of DSP 52 which are also capable of carrying out the intended function thereof.

In general CODEC 50 and DSP 52 either collectively or individually are examples of conversion means for converting between said analog signal incident to said communication interface and said digital signal transceived by said wireless interface means. One skilled in the art can identify various other embodiments of conversion means.

The digital signal generated by CODEC 50 and DSP 52 is output to wireless interface 30. In this present embodiment of the present invention, wireless interface 30 provides the manipulation of the digital signal from DSP 52 to the unique digital signal to be transmitted through wireless telephone 22. In general, wireless interface 30 is one example of wireless interface means for identifying a specific type of wireless telephone and further capable of transceiving a digital signal unique to said specific type of wireless telephone. Other examples of wireless interface means may include the combination of CODEC 50, DSP 52 and wireless interface 30, the combination of DSP 52 and wireless interface 30, or the like.

Wireless interface 30 is designed to interface with wireless telephone 22. Due to the wide variety of wireless telephones available, and because each wireless telephone has a particular interface plug, cable 20 would depend upon the specific wireless telephone selected. Wireless interface 30 has a number of conductor lines 58*a* through 58*z* that carry 22 the transceived signals to and from wireless telephone 22.

Wireless interface 30, in one embodiment, manipulated the signal transceived by DSP 52 such that the signals are either transmitted or received on the appropriate conductor line 58*a* through 58*z* corresponding to the conductor lines within wireless telephone 22. As such, wireless interface 30 may solely perform the transformation of the digital signal from CODEC 50 to a wireless transceiver compatible signal which is unique to the specific type of wireless telephone 22 within the wireless communication network.

When wireless interface 30 incorporates a serial or serial like port, universal wireless adaptor device 18 preferably utilizes the capabilities of a universal asynchronous receiver-transmitter or UART (not shown) to manage asynchronous serial communication. The UART is preferably included in the preferred embodiment of the present invention and may be bypassed when a serial or serial-like port is not used within universal wireless adaptor device 18. The UART performs the functionality necessary to transmit signals along conductor lines 58*a* through 58*z* in a specific order that corresponds with the conductor lines with wireless telephone 22. The UART may include transmit, receive, data set ready, data terminal ready, request to send, clear to ring, ring to indicate, or the like conductor lines.

According to another aspect of the present invention, wireless interface 30 includes cable identification (cable ID) for various types of wireless telephone. Cable ID is described in detail in U.S. Pat. No. 5,649,001 issued to Thomas et al. which is herein incorporated by reference. In general, cable ID comprises of a communication interface device and a communication adaptor cable. The communication interface device may be incorporated within universal wireless adaptor device 18 while the communication adaptor cable may have a form similar to cable 20 and cooperate with wireless interface 30. The communication adaptor cable is specific to, in this particular configuration, the particular wireless telephone 22 which is used within wireless communication system 10. Communication interface device recognizes the specific cable which is connected within wireless interface 30 and configures conductor lines 58*a* through 58*z* in accordance with the conductor line configuration of wireless telephone 22. By so doing, the necessary signal or data stream created by DSP 52 and/or wireless interface 30 is output to conductor line 58*a* through 58*z* in the requisite order to coincide with the conductor lines of wireless telephone 22.

Wireless interface 30, in view of the teaching contained herein could take various other forms which may or may not require the use of a UART, cable ID or the like. Additionally, wireless interface 30 could have a number of conductor lines 58*a* through 58*z* which correspond to a serial port, a parallel port, or ports having characteristics of serial or parallel ports.

Figure 4:
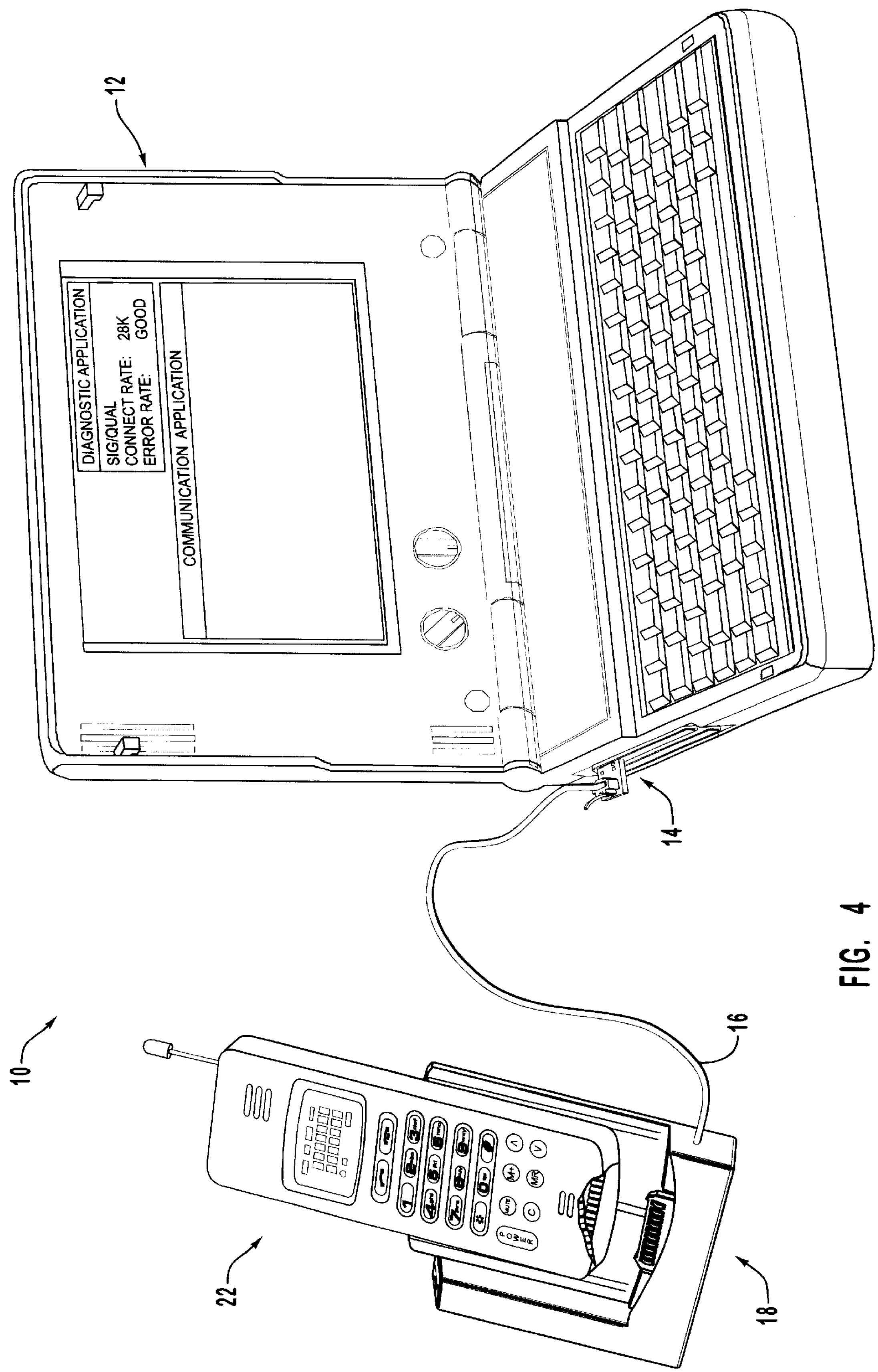
FIG. 4 is a perspective view of an alternate embodiment of the wireless communication system in accordance with the present invention.
Figure 5:
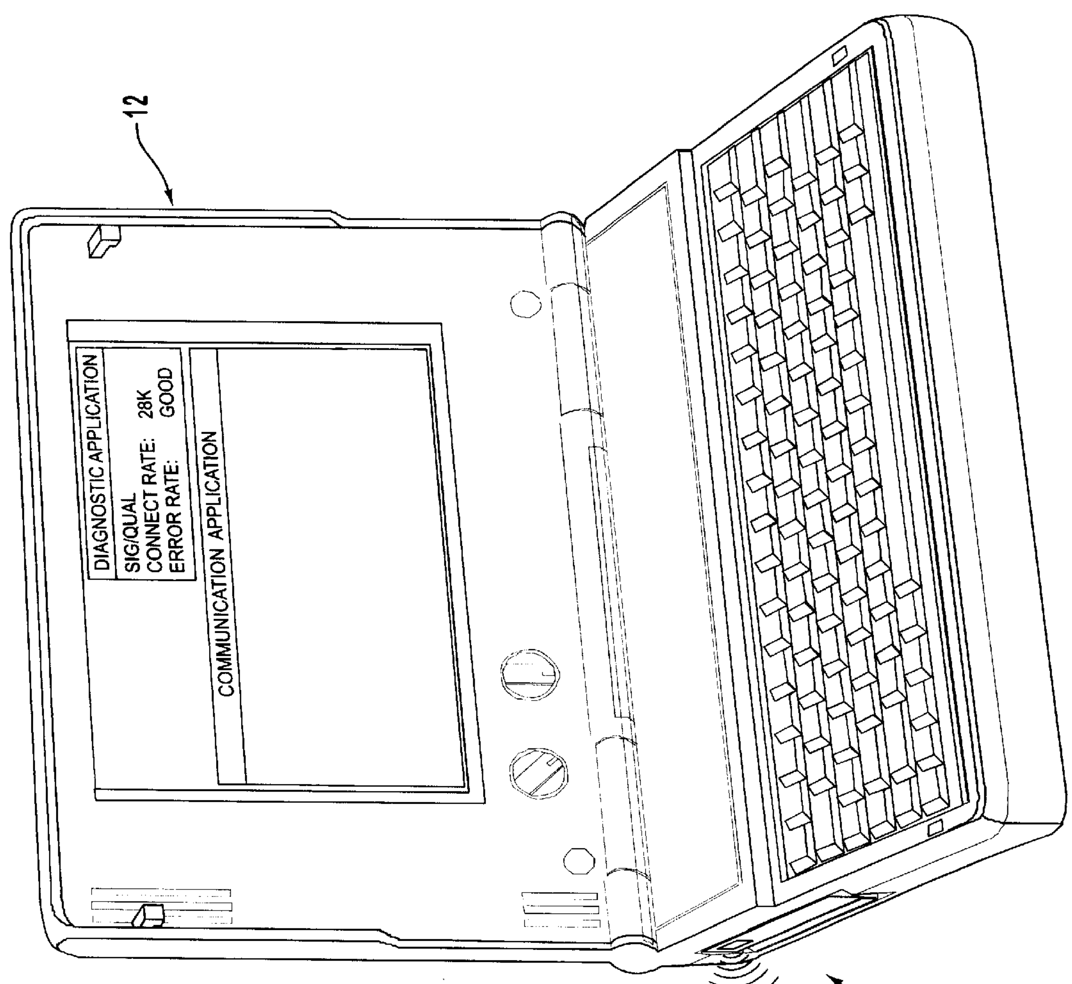
FIG. 5 is a perspective view of yet another alternate embodiment of the wireless communication system in accordance with the present invention.
Figure 5:
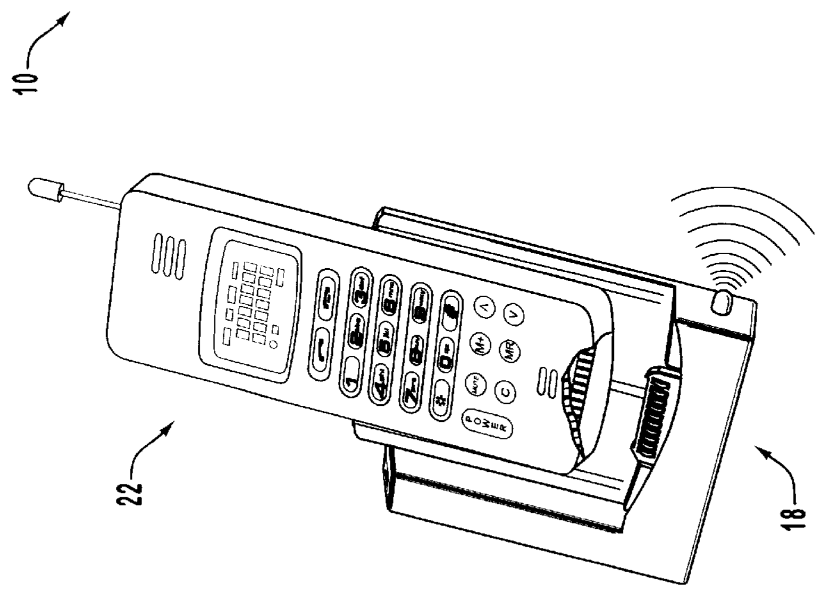

In general, universal wireless adaptor device 18 may have various other configurations and forms as discussed herein. For example, as shown in FIG. 4, universal wireless adaptor device 18 has the form of a cradle within which a specific types of wireless telephone 22 is insert such that conductor lines 58*a* through 58*z* correspond with the conductor lines of wireless telephone 22. In another configuration, as shown in FIG. 5, universal wireless adaptor device 18 is further capable of converting the digital signal created by DSP 52 and/or wireless interface 30 into an infrared (IR) or radio frequency (RF) signal. The IR or RF signal is output to wireless telephone 22 which would be IR or RF compatible. In yet another configuration, universal wireless adaptor device 18 may be configured with the necessary circuitry to have advanced features which are normally associated with advanced modems in the event that modem 14 is not provided with the same. Such features include, but are not limited to, the provisions for both manual and automatic dialing, provisions for both manual and automatic answering, provisions for multiple data rates and communication protocols, asynchronous communication between universal wireless adaptor device 18, modem 14 and host 12, automatic recall of previous configuration when switched on, a range of various data formats, standardized AT commands, automatic communication adapter cable equalization, pulse dialing or frequency dialing, detection of current communication state, diagnostic ability, and other features.

Currently, many of these features are contained with in standard modem type single or multi chip or chip sets, such as chip sets available from Rockwell, AT&T, Cirrus, Sierra, Motorola, Intel, Zylog, and other manufactures. Moreover, such chip sets typically comprise a micro control unit and a digital signal processor portion such that the chip set may perform the functional operations of DSP 52.

In general universal wireless adaptor device 18 may have various forms and components as necessary to perform the function described herein. For example, universal wireless adaptor device 18 can be designed for a low power or portable application, such as a laptop, where universal wireless adaptor device 18 is capable of supporting a low power sleep mode. In such a mode, universal wireless adaptor device 18 will, under certain criteria, enter a low power standby or sleep state whereby power consumption is greatly reduced. In another configuration, DSP 52 and wireless interface 30 are combined into one functional block. In yet another configuration of the present invention, CODEC 50 and DSP 52 are combined into one functional block. In still yet another configuration of the present invention, CODEC 50, DSP 52 and wireless interface 30 are combined into one functional block. In view of the teaching contained herein, one skilled in the art can identify various other configurations of the components within universal wireless adaptor device 18.

Turning now to FIG. 6, a flow diagram depicting the operation of universal wireless adaptor device 18 in the receive and transmit modes. In this particular embodiment of the present invention, wireless interface 28 is configured for a specific type of wireless telephone 22 such that conductor lines 58*a* through 58*z* are predetermined and need not be configured during transmission and reception of signals or data. It can be appreciated that other configuration of the present invention may utilize the benefits of a Cable ID system as reference in U.S. Pat. No. 5,649,001.

Figure 6A:
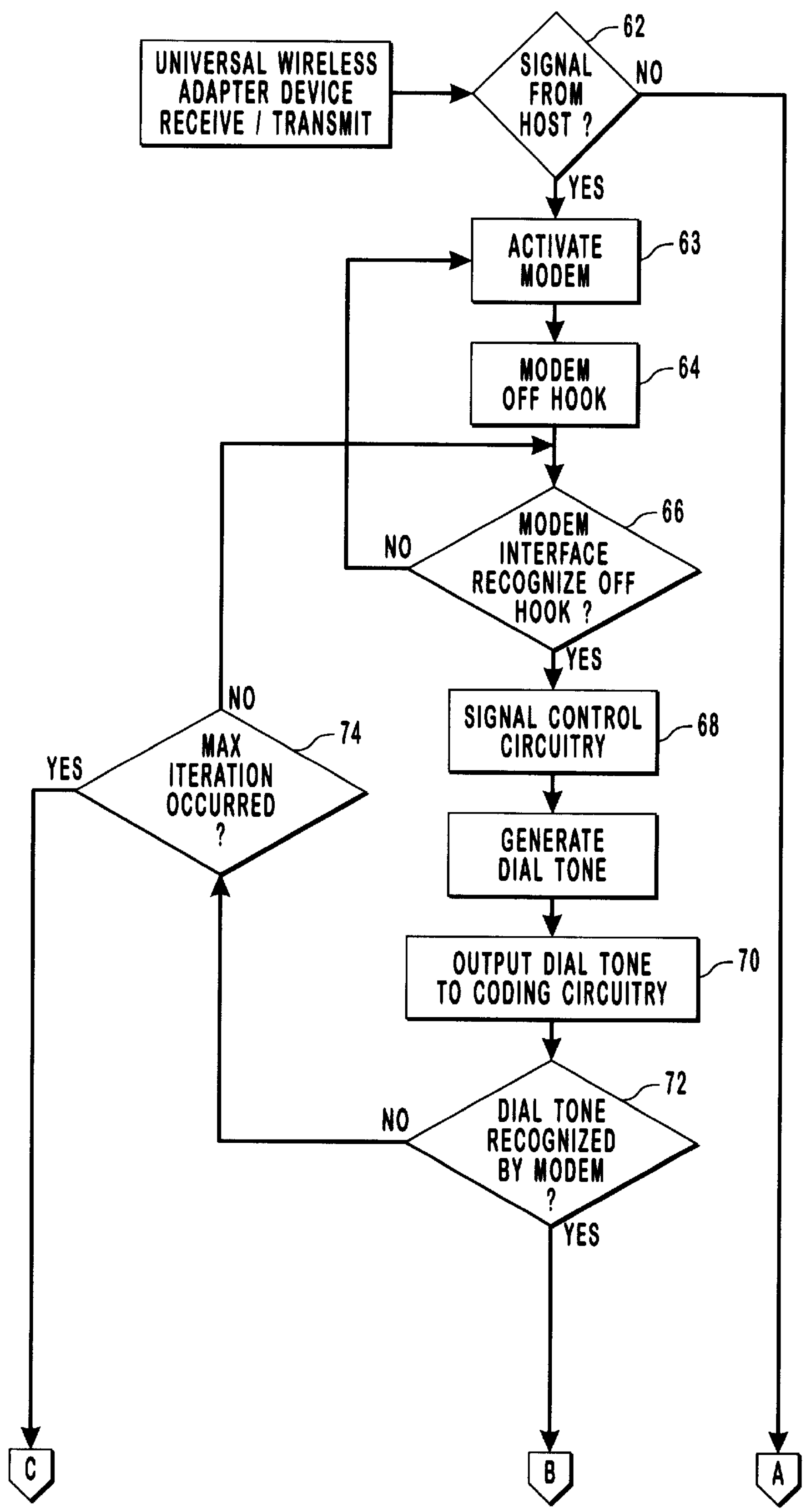
FIG. 6 is a flow diagram depicting the operation of the wireless adaptor in accordance with the present invention.

Referring now to FIG. 6A, when a signal is transmitted or received, in one preferred configuration universal wireless adaptor device 18 reacts differently if the signal is received by universal wireless adaptor device 18 than to be transmitted by universal wireless adaptor device 18. Such a distinction is depicted in FIG. 6A by decision block 62. FIG. 6A represents the flow of a signal which is to be transceived by a host 12 through universal wireless adaptor device 18. If a signal is generated by host 12, it is necessary to activate modem 14 in a step 63 such that it is in the "off-hook" state ready to transmit the signal, as shown in step 64.

Once modem 14 has reverted to the "off-hook" state it is necessary for modem interface 24 to recognize that modem 14 is in the "off-hook" state, as represent by decision block 66. When modem interface 24 or more specifically DAA 32 recognizes that modem 14 is in the "off-hook" state and drawing current, DAA 32 sends a signal to control circuitry 28 or DSP 52, represented by step 68. This signal informs DSP 52 that modem 14 is waiting to transmit a signal. Consequently, DSP 52 generates a dial tone and sends the dial tone to coding/decoding circuitry 26, which in this preferred embodiment is CODEC 50, as shown in step 70. Modem 14 waits until it recognizes the dial tone sent by coding/decoding circuitry 26 through modem interface 24, as represented by decision block 72. In the event that no dial tone is recognized by modem 14, control circuitry 28 attempts to connect for a prescribed number of iterations before switching off, as represented by decision block 74. When dial tone is recognized, universal wireless adaptor device 18 is prepared to transmit signals from host 12 and modem 14.

Figure 6B:
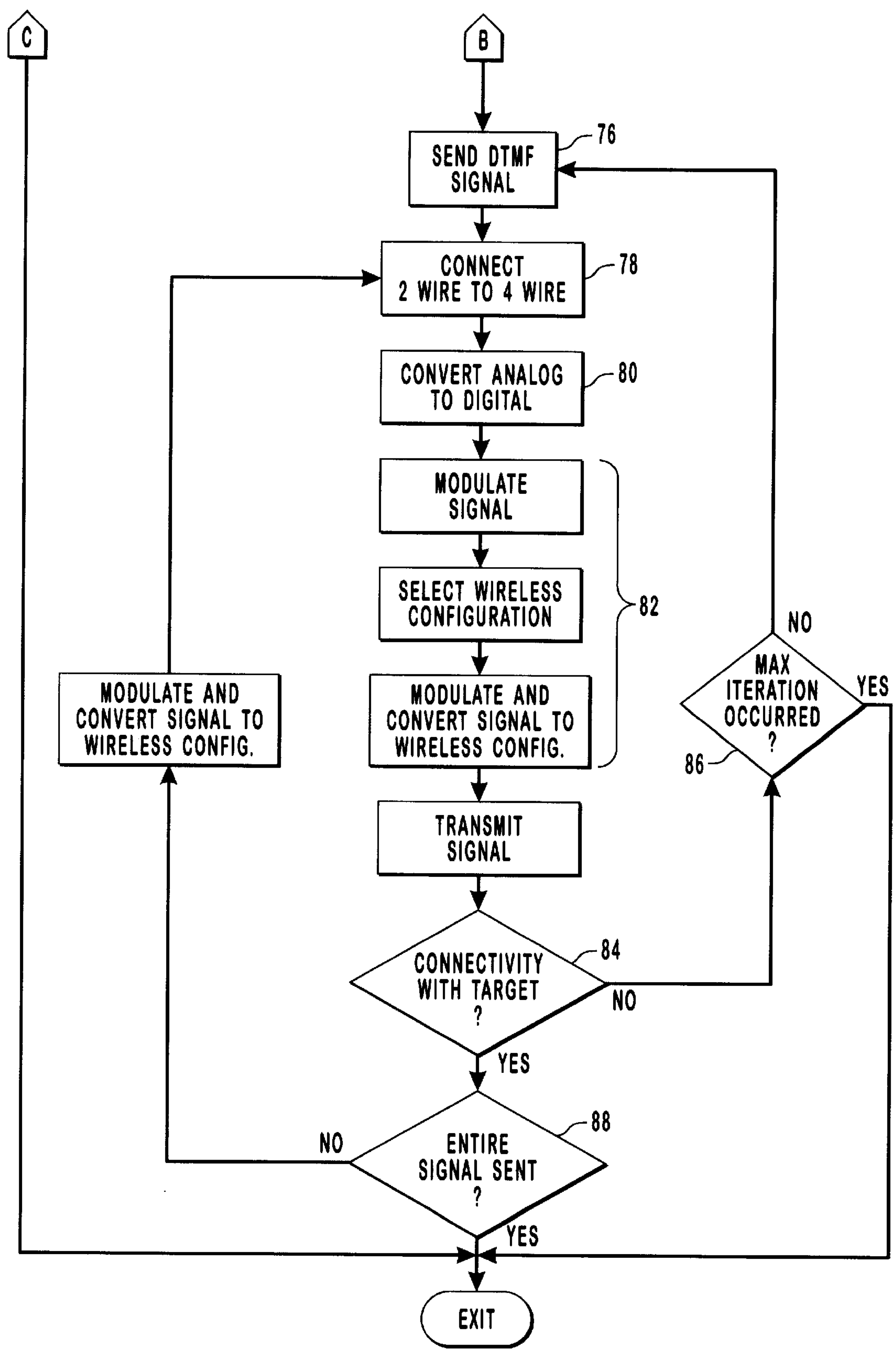

Referring now to FIG. 6B, when dial tone is recognized, modem 14 sends the necessary telephone number to modem interface 24 by way of a dual tone, multi frequency (DTMF) signal in the form of electrical pulses, as depicted by step 76. Modem 14 "sees" modem interface 24 as part of the PSTN lines and sends an analog signal towards the "perceived" target transceiver, or wireless telephone 22. The electrical pulses containing the telephone number are input to modem interface 24 or, in this preferred embodiment DAA 32. DAA 32 then converts the DTMF signal from 2 wire to 4 wire, as previously discussed and represented by step 78. The DTMF signal output from DAA 32 is input to CODEC 50. CODEC 50 converts the DTMF signal from analog to digital format, as depicted in step 80, and sends the newly formed digital signal to control circuitry 28 or DSP 52. DSP 52 modulates and manipulates the digital signal to a wireless transceiver compatible standard in view of the specific type of wireless transceiver data standard incorporated within wireless telephone 22. as represented by bracketed steps 82. This may be accomplished with the aid of a UART which performs the necessary framing and buffering of the signal, such that a sequence of bytes forming the signal are combined into an electronic packet which is more effectively transmitted to wireless telephone 22.

Manipulation of the digital signal to the wireless transceiver compatible standard corresponds to manipulation of the signal to a wireless transceiver compatible signal that is capable of being transceived by conductor line 58*a* through 58*z*. The signal is prepared by DSP 52 and wireless interface 30 and transmitted to wireless telephone 22.

Once the signal has been transmitted through wireless telephone 22 it is necessary to verify that connectivity has occurred with the requisite transceiver, or end host (not shown), as represented by decision block 84. In the event that no connectivity occurs at this point, universal wireless adaptor device 18 continues to manipulate, modulate, convert and transmit the DTMF signal for a predefined number of iterations, after which DSP 52 stops attempting to connect, as shown by decision block 86.

Through the process of transmitting a DTMF signal universal wireless adaptor device 18 creates a connection with wireless telephone 22. Wireless telephone 22 or the end host is informed of a pending signal and is prepared to receive the remainder of the signal from host 12, as depicted by decision block 88. Universal wireless adaptor device 18 transmits the remainder of the signal from host 12 to the end host by repeating steps 78 through 88.

Figure 6C:
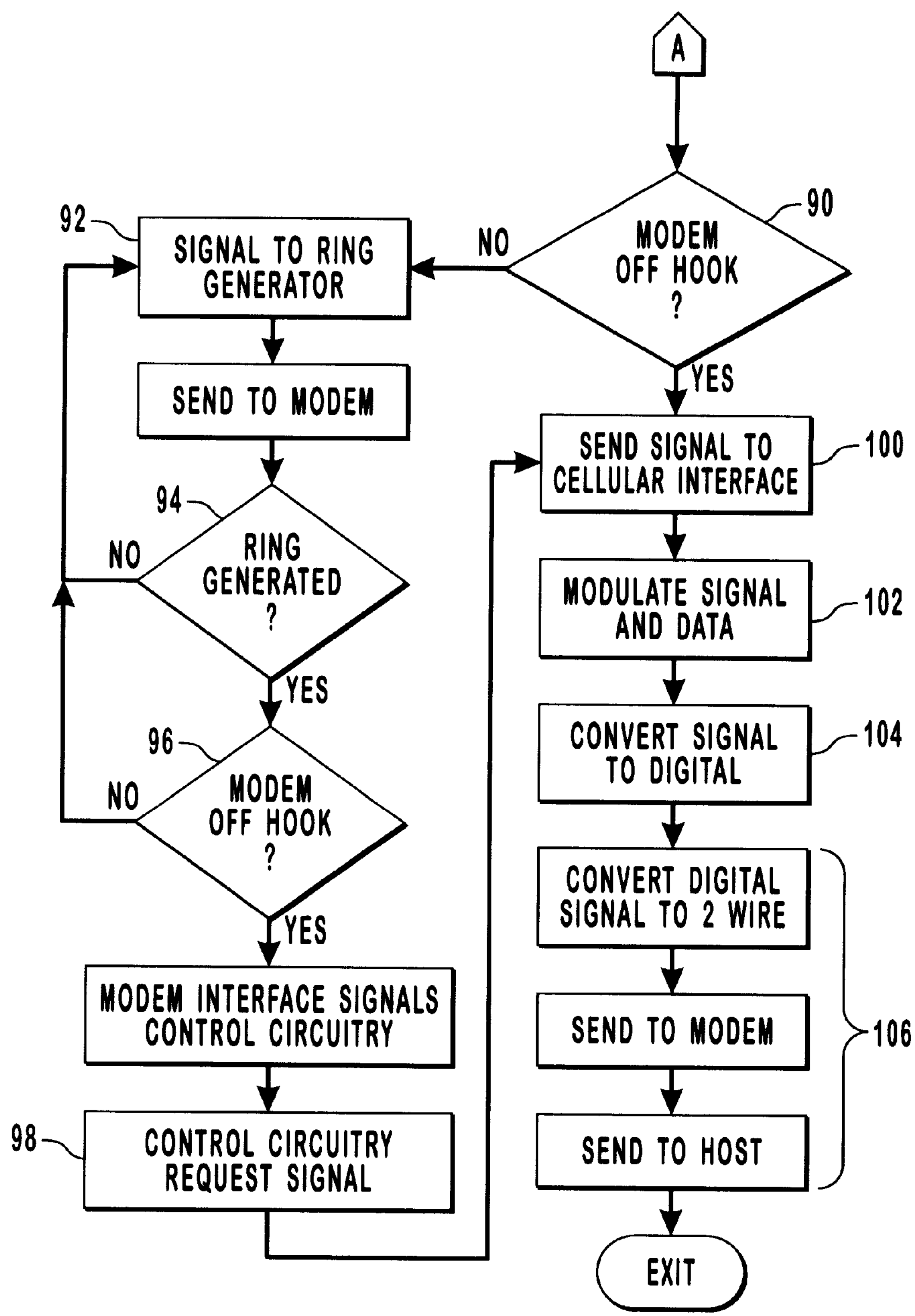

Referring again to decision block 60 of FIG. 6A, in receiving mode universal wireless adaptor device 18 performs separate functions to permit transmission of a signal from wireless telephone 22. Referring now to FIG. 6C, initially, universal wireless adaptor device 18 determines whether modem 14 is "off-hook," as depicted in decision block 90. The activation request transmitted by wireless telephone 22 for an "off-hook" modem 14 is transmitted to wireless interface 30. Wireless interface 30 outputs a request to DSP 52 to verify that modem 14 is "off-hook." DSP 52 transmits a signal to DAA 32 that determines the status of modem 14. In the event that modem 14 is "on-hook", DAA 32 outputs a signal to DSP 52 identifying that modem 14 is "on-hook." DSP 52 sends a signal to ring generator 54 to create a ring signal on the PSTN lines, as depicted in step 92. This is achieved when ring generator 54 draws a voltage from power supply 56 and applies a line and ring voltage to DAA 32 which drives the voltage along the PSTN lines, as depicted by decision block 94. DAA 32 subsequently waits to identify whether modem 14 receives the ring signal and goes "off-hook," as represented in decision block 96. In the event that modem 14 goes "off-hook," DAA 32 outputs a signal to DSP 52 identifying the "off-hook" condition, such that DSP 52 begins to accept data from wireless interface 30, as shown by step 98.

Once connectivity is achieved universal wireless adaptor device 18 performs similar functionality as previously discussed with regards to the transmit mode, while in reverse order. Therefore, wireless interface 30 receives the signal from wireless telephone 22, as depicted in step 100. Wireless interface 30 outputs the signal to DSP 52 which manipulates and modulates the signal from the wireless transceiver data standard to a digital signal, as depicted in step 102. The signal is output from DSP 52 to CODEC 50 which converts the signal from a digital signal to an analog signal, as depicted by step 104. The converted signal is transmitted through DAA 32 to modem 14 and host 12, as depicted by bracketed steps 106.

The present invention may be embodied in other specific forms without departing from the spirit or essential characteristics. The described embodiments are to be considered in all respect only illustrative and not restrictive. She scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A universal wireless adaptor device for operatively coupling of an analog modem to a wireless transceiver within a wireless communication system, comprising:

(a) a communication interface configured to communicate with a modem capable of solely transceiving an analog signal and for physically externally coupling with said modem;

(b) wireless interface means for transceiving a digital signal unique to said specific type of said wireless transceiver and for physically externally coupling with said wireless transceiver; and (c) conversion means for converting between said analog signal incident to said communication interface and said digital signal transceived by said wireless interface means, said wireless adaptor being separately detachable from said modem and said wireless transceiver allowing each to operate independent of said wireless adaptor.

2. A device as recited in claim 1, wherein the universal wireless adaptor device further comprises a ring generator and a power supply.

3. A device as recited in claim 1, wherein said communication interface is formed from a direct access arrangement provide with a "off-hook" detection circuit.

4. A device as recited in claim 1, wherein said communication interface is capable of only interfacing with public service telephone network lines.

5. A device as recited in claim 1, wherein said wireless interface means comprises a digital signal processor capable of digitizing said analog signal to a wireless transceiver compatible signal.

6. A device as recited in claim 1, wherein said wireless interface means comprises cable ID which automatically determines the type of wireless transceiver to be connected with the universal wireless adaptor device.

7. A device as recited in claim 1, wherein said wireless interface means comprises a cradle within which said wireless telephone is located.

8. A device as recited in claim 1, wherein said wireless interface means comprises an infrared transceiver coupled to the universal wireless adaptor device and a corresponding infrared transceiver coupled to said wireless transceiver.

9. A device as recited in claim 1, wherein said wireless interface means comprises an radio frequency transceiver coupled to the universal wireless adaptor device and a corresponding radio frequency transceiver coupled to said wireless transceiver.

10. A device as recited in claim 1, wherein said conversion means comprises a circuitry capable of converting a wireless transceiver compatible signal into an infrared signal.

11. A device as recited in claim 1, wherein said conversion means comprises a circuitry capable of converting a wireless transceiver compatible signal into a radio frequency signal.

12. A device as recited in claim 1, wherein said conversion means comprises a coder/decoder in combination with a digital signal processor capable of digitizing a signal from said coder/decoder to a wireless transceiver compatible signal.

13. A wireless communication system configured to transceive information through use of a wireless transceiver, the wireless communication system comprising:

(a) a host configured to transmit and receive a signal;

(b) an analog-only capable modem in communication with said host, said modem being capable of transceiving said signal within an analog communication network; and (c) wireless adaptor means for operatively coupling of an analog modem to a wireless transceiver for transforming said signal transceived by said modem such that said wireless transceiver is capable of transceiving said signal, said adaptor including:

a. a communication interface configured to communicate with a modem capable of solely transceiving an analog signal and for physically externally coupling with said modem;

b. wireless interface means for transceiving a digital signal unique to said specific type of said wireless transceiver and for physically externally coupling with said wireless transceiver; and c. conversion means for converting between said analog signal incident to said communication interface and said digital signal transceived by said wireless interface means, said wireless adaptor being separately detachable from said modem and said wireless transceiver allowing each to operate independent of said wireless adaptor.

14. A system as recited in claim 13, wherein said host comprises a personal computer.

15. A system as recited in claim 13, wherein said analog-only capable modem is formed from a PCMCIA form factor.

16. A system as recited in claim 13, wherein said wireless adaptor means comprises a cradle within which wireless transceiver is located.

17. A system as recited in claim 13, wherein said wireless adaptor means utilizes infrared technology to transceive signals from said analog-only capable modem and said wireless transceiver.

18. A system as recited in claim 13, wherein said wireless adaptor means utilizes radio frequency technology to transceive signals from said analog-only capable modem and said wireless transceiver.

19. A system as recited in claim 18, wherein said communication interface comprises a direct access arrangement.

20. A system as recited in claim 19, wherein said direct access arrangement is formed with "off-hook" detection capabilities.

21. A system as recited in claim 18, wherein said wireless interface is formed with an infrared transceiver.

22. A system as recited in claim 18, wherein said wireless interface is formed with a radio frequency transceiver.

23. A system as recited in claim 18, wherein said wireless interface utilizes cable ID.

24. A system as recited in claim 18, wherein said conversion circuit comprises a digital signal processor and a CODEC.

* * * * *